(12) United States Patent
Chuang

(10) Patent No.: US 12,287,237 B2
(45) Date of Patent: Apr. 29, 2025

(54) OBJECT INFORMATION DETECTION DEVICE

(71) Applicant: Rayprus Technology (Foshan) Co., Ltd., Foshan (CN)

(72) Inventor: Chun Chuang, Taipei (TW)

(73) Assignee: Rayprus Technology (Foshan) Co., Ltd., Foshan (CN)

( * ) Notice: Subject to any disclaimer, the term of this patent is extended or adjusted under 35 U.S.C. 154(b) by 0 days.

(21) Appl. No.: 18/378,257

(22) Filed: Oct. 10, 2023

(65) Prior Publication Data

US 2024/0118133 A1 Apr. 11, 2024

(30) Foreign Application Priority Data

Oct. 11, 2022 (CN) .......................... 202211242723.3

(51) Int. Cl.
*G01J 1/04* (2006.01)

(52) U.S. Cl.
CPC .................................. *G01J 1/0407* (2013.01)

(58) Field of Classification Search
CPC .... G01J 1/0407; G01S 7/4811; G01S 7/4814; G01S 7/4816; G01S 17/93; G01S 17/003; G02B 17/06; G02B 17/0684; G02B 27/0916; G02B 27/0983

See application file for complete search history.

(56) References Cited

U.S. PATENT DOCUMENTS

| | | | |
|---|---|---|---|
| 7,920,337 B2* | 4/2011 | Perchak | G02B 5/001 359/709 |
| 2013/0076893 A1* | 3/2013 | Jeong | G05D 1/0248 348/135 |
| 2022/0381911 A1* | 12/2022 | Gaalema | G01S 7/4816 |

FOREIGN PATENT DOCUMENTS

| | | |
|---|---|---|
| CN | 109765542 A | 5/2019 |
| CN | 112698351 A | 4/2021 |

* cited by examiner

*Primary Examiner* — Thanh Luu
*Assistant Examiner* — Mai Thi Ngoc Tran
(74) *Attorney, Agent, or Firm* — ScienBiziP, P.C.

(57) ABSTRACT

A detection device comprises a light emitting element, a first optical element and a light receiving element. The light emitting element is configured for emitting a first light beam. The first optical element is arranged on an optical path of the first light beam, and capable of reflecting the first light beam to form a second light beam transmitting in different directions circumferentially at the same time. The second light beam can be reflected by objects on an optical path of the second light beam to form a third light beam. The light receiving element is configured for receiving the third light beam.

9 Claims, 5 Drawing Sheets

OBJECT INFORMATION DETECTION DEVICE

FIELD

The application relates to a detection device.

BACKGROUND

An electronic chip of a computer or server generates a lot of heat during operation. The heat generated by the chip needs to be dissipated in time. At present, existing radiator in the server usually uses a heat dissipation medium to disperse heat from the chip and transfer the heat to a cooling system. As the power rates of high-performance chips can reach 300~500 W and more, existing radiators may be difficult to meet an increased demand of heat dissipation.

SUMMARY OF THE INVENTION

The disclosure is to provide a detection device.

In a first aspect, the disclosure provides a detection device, comprising:

a base, the base defines an internal space and a light channel, the internal space extends in an axial direction of the base, the light channel extends in a circumferential direction of the base;

a light emitting element located in the internal space, the light emitting element is capable of emitting a first light beam along an axial direction of the internal space;

a light receiving element located in the internal space, the light receiving element is opposite to the light emitting element along the axial direction of the internal space;

a first optical element located between the light emitting element and the light receiving element, the first optical element is a reflector with a first reflecting surface which is conical, the first reflecting surface is oriented towards the light emitting element, and the central axis of the first reflecting surface is parallel to or coincides with the central axis of the first light beam, the first reflecting surface is capable to reflect the first light beam in a circumferential direction to form a second light beam distributed in a circumferential direction, the second beam is capable to pass through the optical channel and be reflected by an external object to form a third light beam;

a second optical element located between the first optical element and the light receiving element, the second optical element is a reflector with a second reflecting surface which is conical, the second reflecting surface is oriented towards the light receiving element and is capable of converging the third light beam to the light receiving element.

In a second aspect, the disclosure provides a detection device, comprising:

a light emitting element for emitting a first light beam;

a first optical element disposed on an optical path of the first light beam, the first optical element is capable to reflect the first light beam to form a second light beam, the second light beam transmits in different directions circumferentially at the same time, the second light beam is capable to be reflected by an object on an optical path of the second light beam to form a third light; and a light receiving element for receiving the third light beam.

BRIEF DESCRIPTION OF THE DRAWINGS

In order to more clearly explain the technical scheme of the embodiment of the invention, the accompanying drawings in the embodiment will be briefly introduced below. It should be understood that the following accompanying drawings only show some and not all embodiments of the invention, so they should not be regarded as limiting the scope. For those skilled in the art, without paying creative labor, relevant drawings can also be developed from these drawings.

DETAILED DESCRIPTION

The technical scheme in the embodiment of the application will be described in combination with the attached drawings in the embodiment of the application. Obviously, the described embodiments are only part of the embodiments of the application, not all embodiments.

It should be noted that when an element is said to be "fixed to" another element, it can be directly on another element or there can be an intervening element. When a component is "connected" to another component, it can be directly connected to another component or there may be intermediate components at the same time. When a component is "set on" another component, it can be set directly on another component or there may be intervening components at the same time. The terms "vertical", "horizontal", "left", "right" and similar expressions used in this paper are for illustrative purposes only.

Unless otherwise defined, all technical and scientific terms used herein have the same meanings as those commonly understood by those skilled in the technical field of the application. The terms used in the specification of the application herein are only for the purpose of describing specific embodiments and are not intended to limit the application. The term "and/or" as used herein includes any and all combinations of one or more related listed items.

Some embodiments of the present application are described in detail. Without conflict, the following embodiments and features in the embodiments can be combined with each other.

Embodiments 1 of Disclosure

Figure 1:
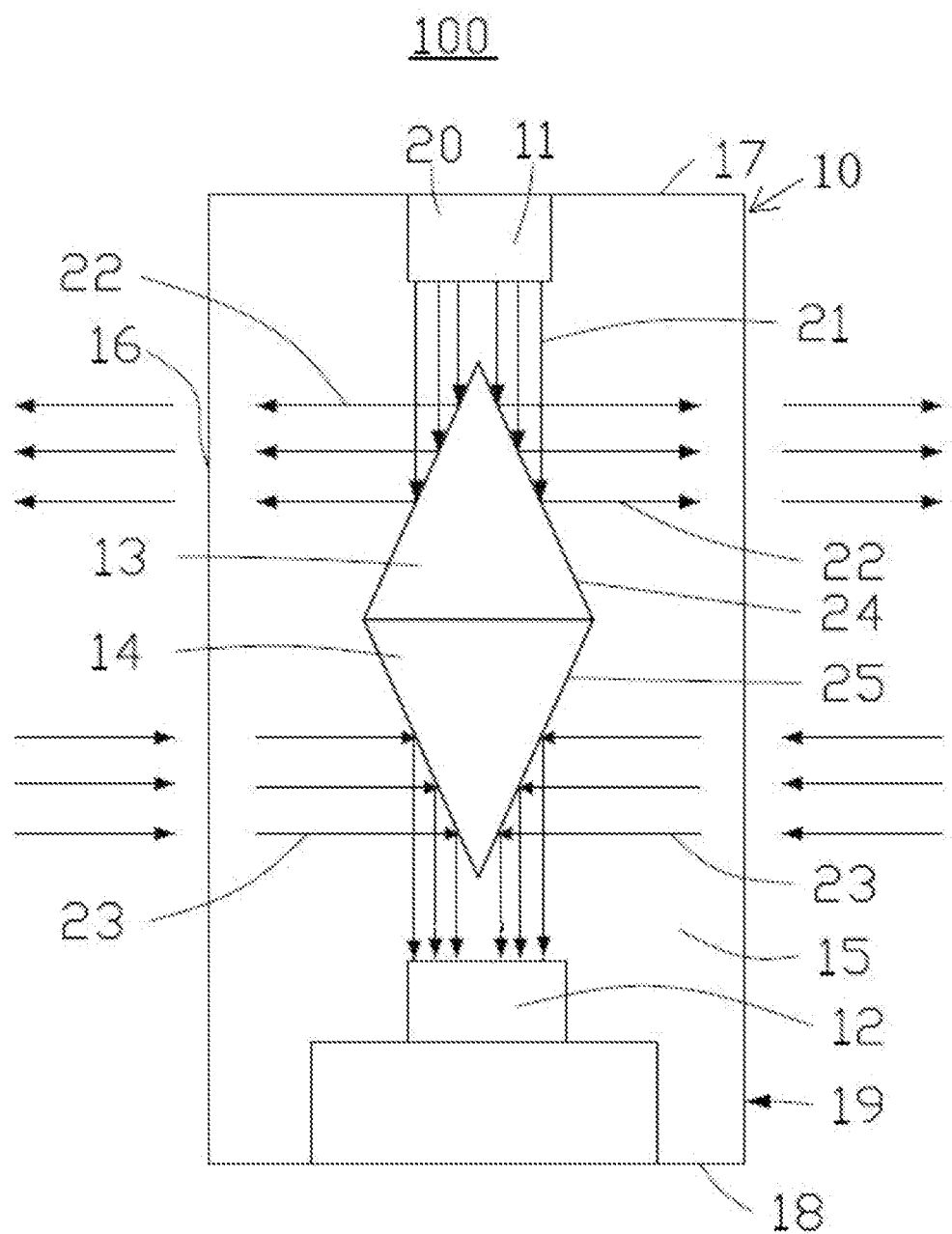
FIG. 1 is a schematic diagram of a detection device according to an embodiment of the disclosure.

Referring to FIG. 1, the embodiment provides a detection device 100, the detection device 100 comprises a base 10, a light emitting element 11, a light receiving element 12, a first optical element 13, and a second optical element 14.

Wherein the base 10 has an internal space 15 extending axially and a light channel 16 extending circumferentially. The internal space 15 is configured to accommodate and install other components, such as the light emitting element 11, the light receiving element 12, the first optical element 13, and the second optical element 14. Light channel 16 is configured to allow light beam to pass through. In the embodiment, the base 10 is roughly a hollow shell, the base 10 comprises a top wall 17, a bottom wall 18, and a peripheral wall 19, the peripheral wall 19 is connected between the top wall 17 and the bottom wall 18. The peripheral wall 19 can be fully transparent or only partially transparent to define the light channel 16 allowing light beam to pass through. The peripheral wall 19 can be partially or entirely made of a hollow structure or made of transparent materials such as glass. The shape of base 10 can be set as needed, for example, it can be cylindrical as shown in FIG. 1, or it can be rectangular, spherical, ellipsoidal, etc.

The light emitting element 11 is located in the internal space 15 and is capable to emit a first light beam 21 along the axis of the internal space 15. As shown in FIG. 1, the light emitting element 11 may be fixed on a side of the top wall 17 facing the bottom wall 18, and may emit the first light beam 21 towards the bottom wall 18. Wherein, the first light beam 21 emitted by the light emitting element 11 may be a laser, and the light emitting element 11 may be a laser device 20, such as a vertical cavity surface emitting laser (VCSEL). In the embodiment, the light emitting element 11 may also comprise an optical element for expanding the light beam.

The light receiving element 12 is located in the internal space 15 and is opposite to the light emitting element 11 along an axial direction of the internal space 15. For example, as shown in FIG. 1, the light receiving element 12 is arranged on a surface of the bottom wall 18 facing the top wall 17.

Figure 2:
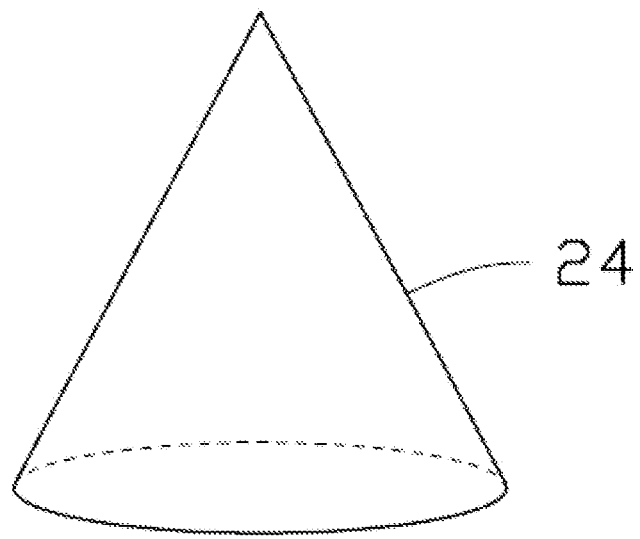
FIG. 2 is a schematic diagram of a first optical element in FIG. 1.

The first optical element 13 is located between the light emitting element 11 and the light receiving element 12. The first optical element 13 is also located in the internal space 15. The first optical element 13 may be supported within the base 10 by a bracket, and the structure of the bracket can be set as needed. For example, the bracket can be connected to the bottom wall 18 or the top wall 17. In the embodiment, the first optical element 13 is a reflector with a first reflecting surface 24 which is conical. The first reflecting surface 24 is oriented towards the light emitting element 11, and the central axis of the first reflecting surface 24 is parallel to or coincides with the central axis of the first light beam 21. Therefore, the first reflecting surface 24 can reflect the first light beam 21 in a circumferential direction to form a second light beam 22 distributed in a circumferential direction. Optionally, as shown in FIG. 2, the first optical element 13 can be completely conical, with its tip facing the light emitting element 11 and its conical surface serving as the first reflecting surface 24. In this way, when the first light beam 21 is incident on the first optical element 13, it is reflected outward from different circumferential positions of the first reflecting surface 24 which is conical, forming the second light beam 22 that can cover the circumferential range. Of course, the second light beam 22 may cover the entire circumference range or only a portion of the circumference range as needed. For example, for some angles that do not require detection, the circumferential range or angle required to be covered by the second light beam 22 can be adjusted by controlling the distribution of the output spot of the first optical element 13 and/or controlling the circumferential extension range of the first reflecting surface 24.

In other embodiments, the first optical element 13 may has a shape of a pyramid (such as a triangular pyramid, a quadrangular pyramid, etc.), a frustum, a hemispherical, or other planar or curved structure.

The second light beam 22 may penetrate outward through the light channel 16 of the base 10. When the second light beam 22 emitted in a certain direction illuminates an environmental object, it will be reflected by the object to form a third light beam 23. The third light beam 23 can be received by the second optical element 14, and be analyzed to obtain information about the object (such as position information of the object).

The second optical element 14 is located between the first optical element 13 and the light receiving element 12. The second optical element 14 may be integrally provided with the first optical element 13. The second optical element 14 may also be separately provided with the first optical element 13. When provided separately, the second optical element 14 and the first optical element 13 may be installed on the base 10 by a same bracket. The second optical element 14 and the first optical element 13 may also be installed separately on the base 10. The first optical element 13 and the second optical element 14 may or may not be connected to each other. In the embodiment, the second optical element 14 is a reflector with a second reflecting surface 25 which is conical. The second reflecting surface 25 is oriented towards the light receiving element 12 and capable of converging the third light beam 23 to the light receiving element 12.

For example, in some embodiments, the second optical element 14 has a shape of a cone. The second optical element 14 can have a same shape with the first optical element 13. In an embodiment, the first optical element 13 and the second optical element 14 has a shape of a cone with same cone angle, and the first optical element 13 and the second optical element 14 are connected in a relatively fixed manner with bottom surfaces overlapping and tips facing opposite to ensure the relative position stability of the two. In this way, the third light beam 23, which is reflected by objects at various angles in the circumference, will be reflected and converged to the light receiving element 12 through the second reflecting surface 25 which is conical.

When the detection device 100 in the embodiment is used, the light emitting element 11 emits the first light beam 21, and the first light beam 21 is emitted by the first optical element 13 to form the second light beam 22. The second light beam 22 may cover a certain circumferential range. If the second light beam 22 is illuminated on an object, second light beam 22 will be reflected by the object to form the third light beam 23, and the third light beam 23 may be converged by the second optical element 14 to the light receiving element 12 for analyzing the information of the object (such as position information of the object).

The detection device 100 in the embodiment may be used as a dTOF (direct time of flight) module to obtain information, such as distance information, contour information, etc., of objects.

The detection device 100 in the embodiment may be used on vehicles, such as cars 210 or planes 220, and the detection device 100 may serve as a module for cars or planes to perceive environmental objects and determine what an environmental object is.

Figure 3:
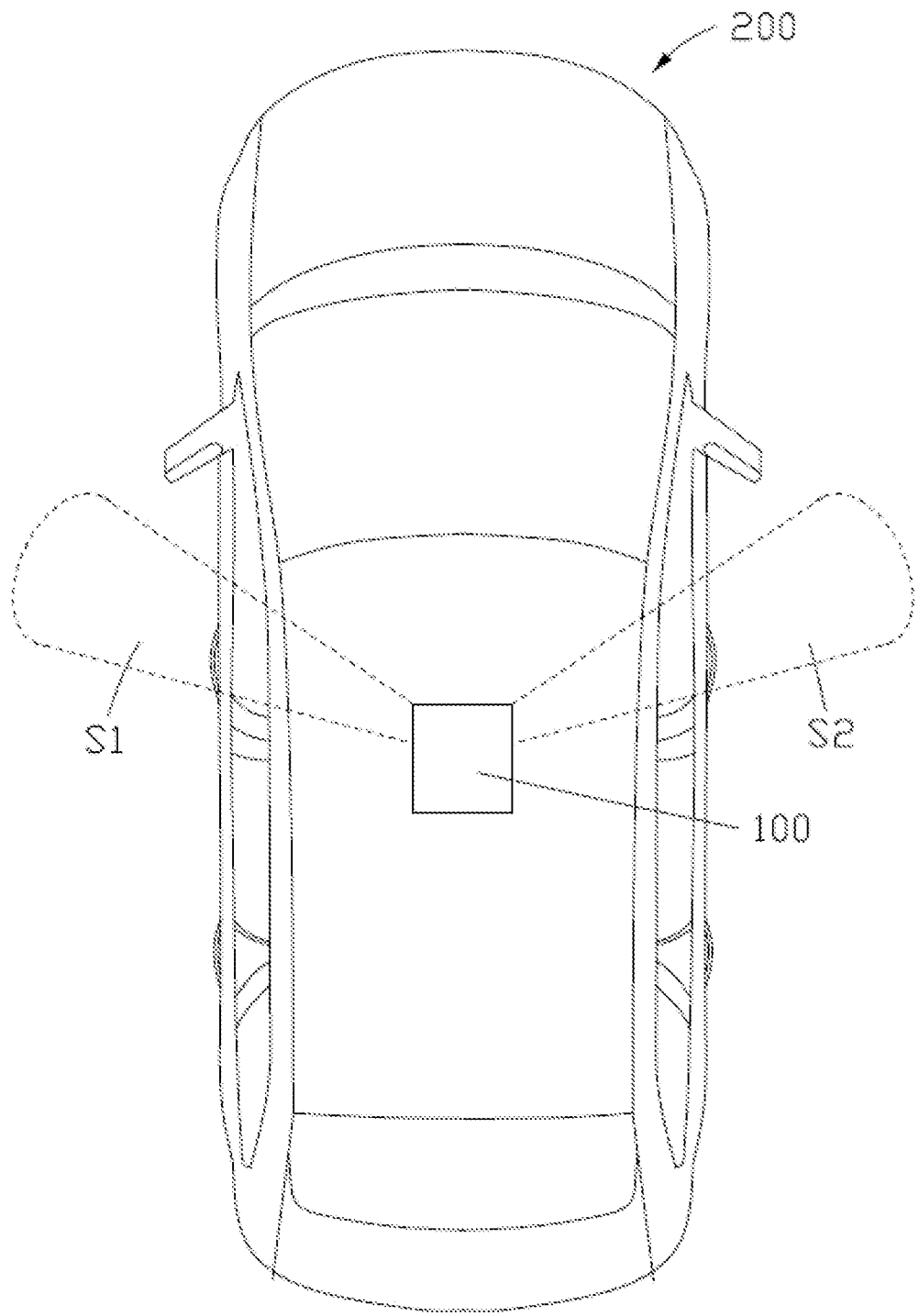
FIG. 3 is a schematic diagram of an automobile comprising the detection device in FIG. 1.
Figure 4:
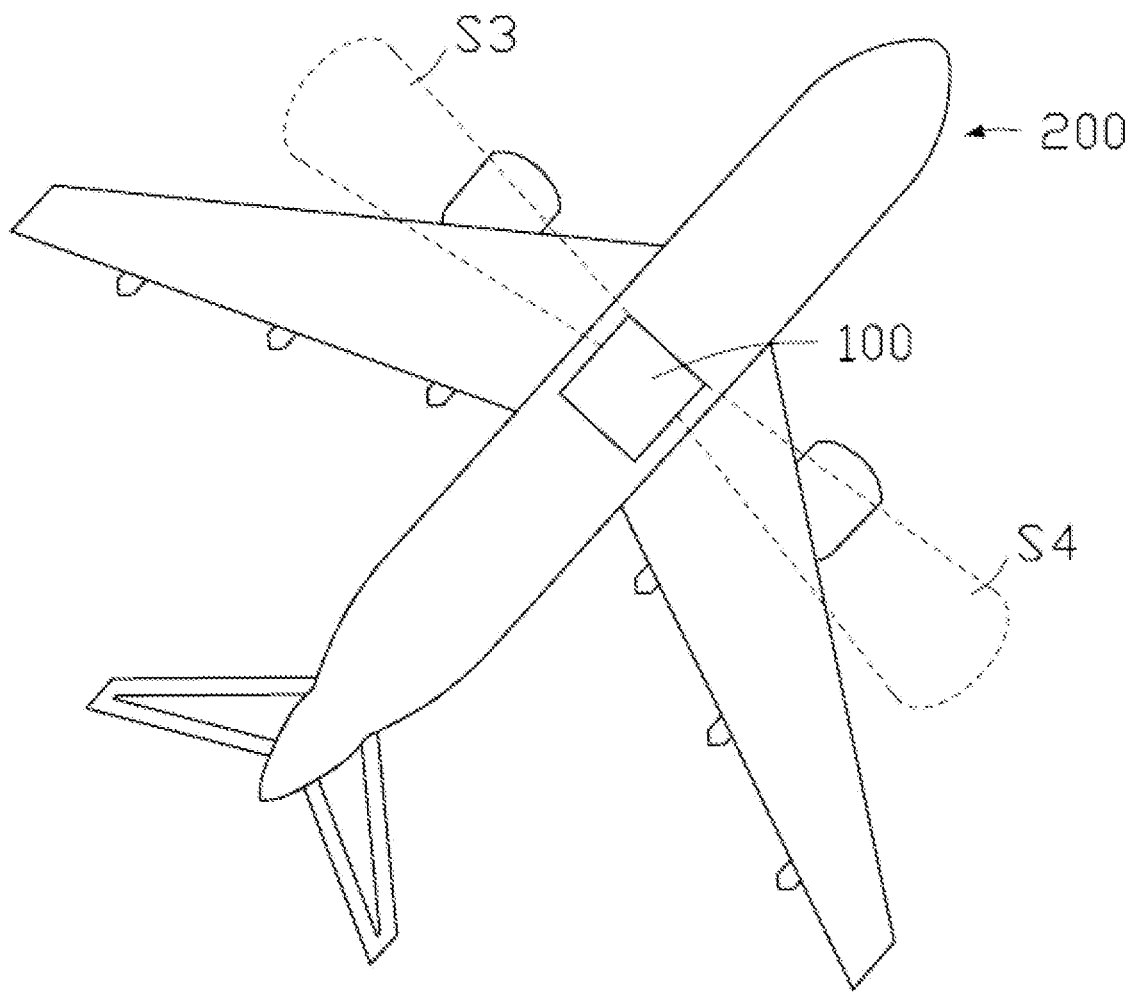
FIG. 4 is a schematic diagram of an aircraft comprising the detection device in FIG. 1.

For example, as shown in FIG. 3, the detection device 100 is used on a car 210. The detection device 100 may be installed on the roof of the car 210, and the second light beam 22 emitted by the detection device 100 may cover areas S1 and S2 on both sides of the car 210. As shown in FIG. 4, the detection device 100 is used on an aircraft 220. The detection device 100 is installed outside the aircraft 220, and the second light beam 22 emitted by the detection device 100 may cover areas S3 and S4 on both sides of the aircraft 220.

When installed on vehicles such as cars 210 or aircrafts 220, the detection device 100 may be fixed to vehicles through the base 10.

The detection device 100 in the embodiment can obtain circumferential range detection without rotation, with a simple structure and low cost. The detection device 100 does not require a circumferential rotating scanning structures (such as scanning mirrors) in some known technologies to achieve circumferential range detection, reducing high cost and high control difficulty caused by complex micro electro mechanical systems (MEMS).

Moreover, the detection device 100 may also achieve desired detection range by controlling the shape of the spot of the light emitting element 11 or the reflection area of the first reflecting surface 24 or the second reflecting surface 25, which is convenient to set. For example, for areas that do not require detection, it can be achieved by making the spot of the first light beam 21 in relative range emit no light in that area, or by canceling the reflection function in the relative area of the first reflecting surface 24 or the second reflecting surface 25.

Embodiment 2 of the Disclosure

Figure 5:
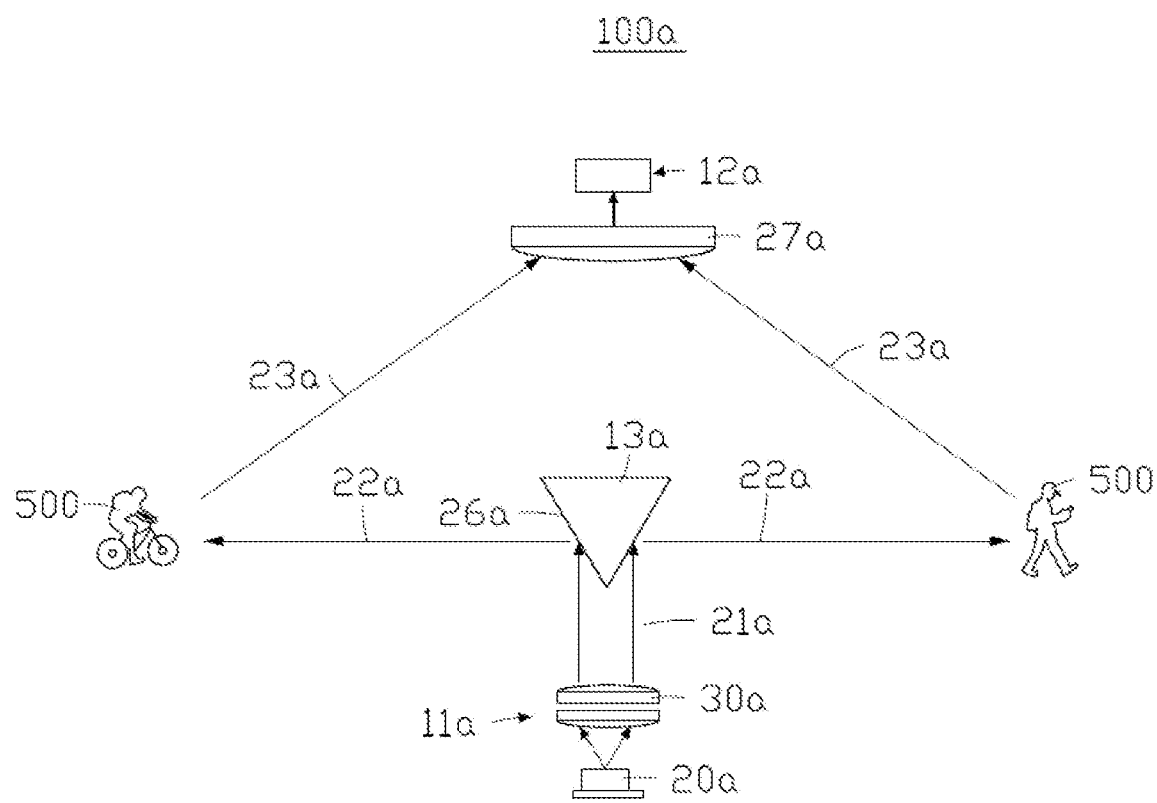
FIG. 5 is a schematic diagram of a detection device according to another embodiment of the disclosure.

Referring to FIG. 5, the embodiment provides a detection device 100a. The detection device 100 comprises a light emitting element 11a, a first optical element 13a, and a light receiving element 12a.

The light emitting element 11a is configured to emit a first light beam 21a. The light emitting element 11a may comprise a laser device 20a and a beam expansion component 30a. The laser device 20a is configured to provide a laser beam, and the beam expansion component 30a is configured to expand the laser beam, so that the spot of the laser beam has a certain size to cover a certain range of area. In the embodiment, the laser device 20a may use a vertical cavity surface emitting laser (VCSEL). The beam expansion component 30a may use known beam expansion mirrors or mirror groups.

The first optical element 13a is located on the optical path of the first light beam 21a and can reflect the first light beam 21a to form a second light beam 22a. The second light beam 22a simultaneously emits in different circumferential directions. Optionally, the first optical element 13a has a reflecting surface 26a which is conical or pyramid. The reflecting surface 26a is opposite to the light emitting element 11a and is configured for reflecting the first light beam 21a to form the second light beam 22a distributed along the circumference. Optionally, the reflecting surface 26a is a conical surface. Optionally, the axis of the reflecting surface 26a coincides or is parallel to the axis of the first light beam 21a. Optionally, the reflecting surface 26a has a annular reflection area, and the annular reflection area is adapted to the first light beam 21a annularly emitted by the light emitting element 11a. The first optical element 13a in the embodiment may be same shape as the first optical element 13 in embodiments 1, such as a conical shape.

In the embodiment, the first optical element 13a is stationary relative to the light emitting element 11a, without the need to be driven by a driving element (such as a rotating motor), as is the case with scanning mirrors that require rotation in some known technologies.

The second light beam 22a may be reflected by objects on the optical path of the second light beam 22a to form a third light beam 23a. When the second light beam 22a emitted in a certain direction illuminates an object 500, such as a pedestrian or a non-motorized vehicle as shown in FIG. 5, it will be reflected by the object 500 to form a third light beam 23a.

The light receiving element 12a is configured to receive the third light beam 23a. The light receiving element 12a can be an optical sensor that can receive the third light beam 23a and convert it into an electrical signal for analyzing the position or distance information of the object 500.

In the embodiment, alternatively, the detection device 100a also comprises a wide-angle lens group 27a, which is located on the optical path of the third light beam 23a, and the wide-angle lens group 27a is in front of the light receiving element 12a, for converging and transmitting the third light beam 23a to the light receiving element 12a. Optionally, the wide-angle lens group 27a may be a convex lens or the second optical element 14 which is conical as in embodiment 1.

When the detection device 100a in the embodiment is used, the first optical element 13a guides the first light beam 21a to form a second light beam 22a distributed along the circumference. The second light beam 22a is reflected by the object 500 on the optical path of the second light beam 22a, and the third light beam 23a is received by the light receiving element 12a for analyzing the information, such as distance, outer profile, etc., of the object 500. Moreover, due to circumferential guidance by the first optical element 13a, the detection device 100a can achieve a large range of detection capabilities. Moreover, the detection device 100a does not require a scanning mirror or a MEMS mirror that require rotating to scan, making it simple and low cost. For the scheme of setting the wide-angle mirror group 27a, more third beams 23a enter the light receiving element 12a through the wide-angle mirror group 27a, which can achieve a larger detection range.

After all, the detection device provided in this application has a large detection range, simple structure, low cost, and great industrial practicality.

The above implementation methods are only used to illustrate the technical solution of this application and not to limit it. Although the application has been described in detail with reference to the preferred implementation methods mentioned above, ordinary technical personnel in the art should understand that modifications or equivalent replacements to the technical solution of this application should not deviate from the spirit and scope of the technical solution of this application.

What is claimed is:
1. An object information detection device, comprising:
  a base, the base defines an internal space and a light channel, the internal space extends in an axial direction of the base, the light channel extends in a circumferential direction of the base;
  a light emitting element located in the internal space, the light emitting element is configured to emit a first light beam along an axial direction of the internal space;
  a light receiving element located in the internal space, the light receiving element is opposite to the light emitting element along the axial direction of the internal space;
  a first optical element located between the light emitting element and the light receiving element, the first optical element is a reflector with a first reflecting surface which is conical, the first reflecting surface is oriented towards the light emitting element, the first reflecting surface is configured to reflect the first light beam in the circumferential direction of the base to form a second light beam distributed in the circumferential direction of the base, the second beam passes through the light channel and be reflected by an external object to form a third light beam; and
  a second optical element located between the first optical element and the light receiving element, the second optical element is a reflector with a second reflecting surface which is conical, the second reflecting surface is oriented towards the light receiving element and converges the third light beam to the light receiving element;

the second reflecting surface defines an incidence area and a blocking area, the incidence area is configured to allow the light emitting to the light receiving element, the blocking area is configured to stop the light emitting to the light receiving element.

2. The object information detection device according to claim 1, wherein the base comprises a top wall, a bottom wall, and a peripheral wall, the peripheral wall is connected between the top wall and the bottom wall, the peripheral wall defines the light channel allowing light beam to pass through.

3. The object information detection device according to claim 2, the peripheral wall is fully transparent or partially transparent to define the light channel allowing light beam to pass through.

4. The object information detection device according to claim 3, wherein the peripheral wall is partially or entirely made of a hollow structure or made of transparent materials.

5. The object information detection device according to claim 2, wherein shape of the base is formed as cylindrical, rectangular, spherical or ellipsoidal.

6. The object information detection device according to claim 1, wherein the first optical element and the second optical element has a shape of a cone with same cone angle, and the first optical element and the second optical element are connected in a relatively fixed manner with bottom surfaces overlapping and tips facing opposite to ensure the relative position stability of the two.

7. The object information detection device according to claim 6, wherein the second optical element is integrally provided with the first optical element.

8. The object information detection device according to claim 1, wherein the light emitting element comprises a laser device and a beam expansion component, and a laser emitted by the laser device is expanded by the beam expansion component to form the first light beam.

9. The object information detection device according to claim 1, wherein the first reflecting surface has a reflection area which is annular, the reflection area is adapted to the first light beam annularly emitted by the light emitting element.

* * * * *